Oct. 30, 1962    H. E. SIMI    3,060,538
FASTENING DEVICE
Filed Nov. 3, 1959    3 Sheets-Sheet 3
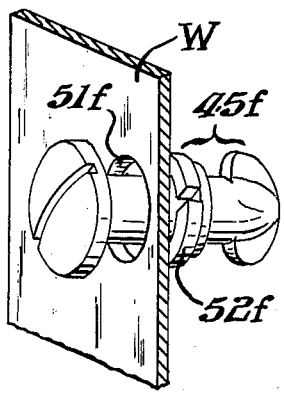
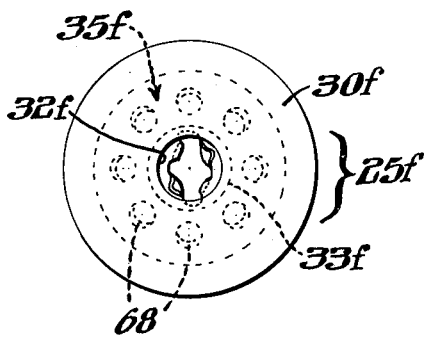
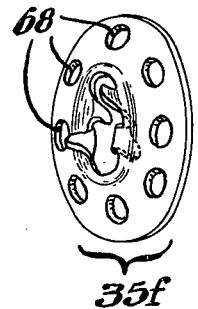
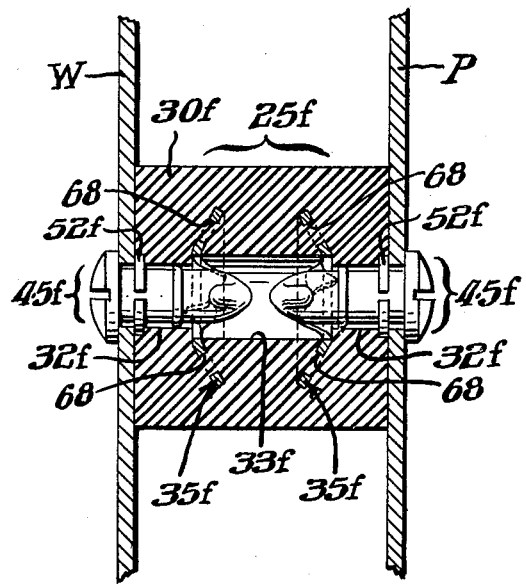
INVENTOR.
Hendrick E. Simi,
BY Paul & Paul
ATTORNEYS.

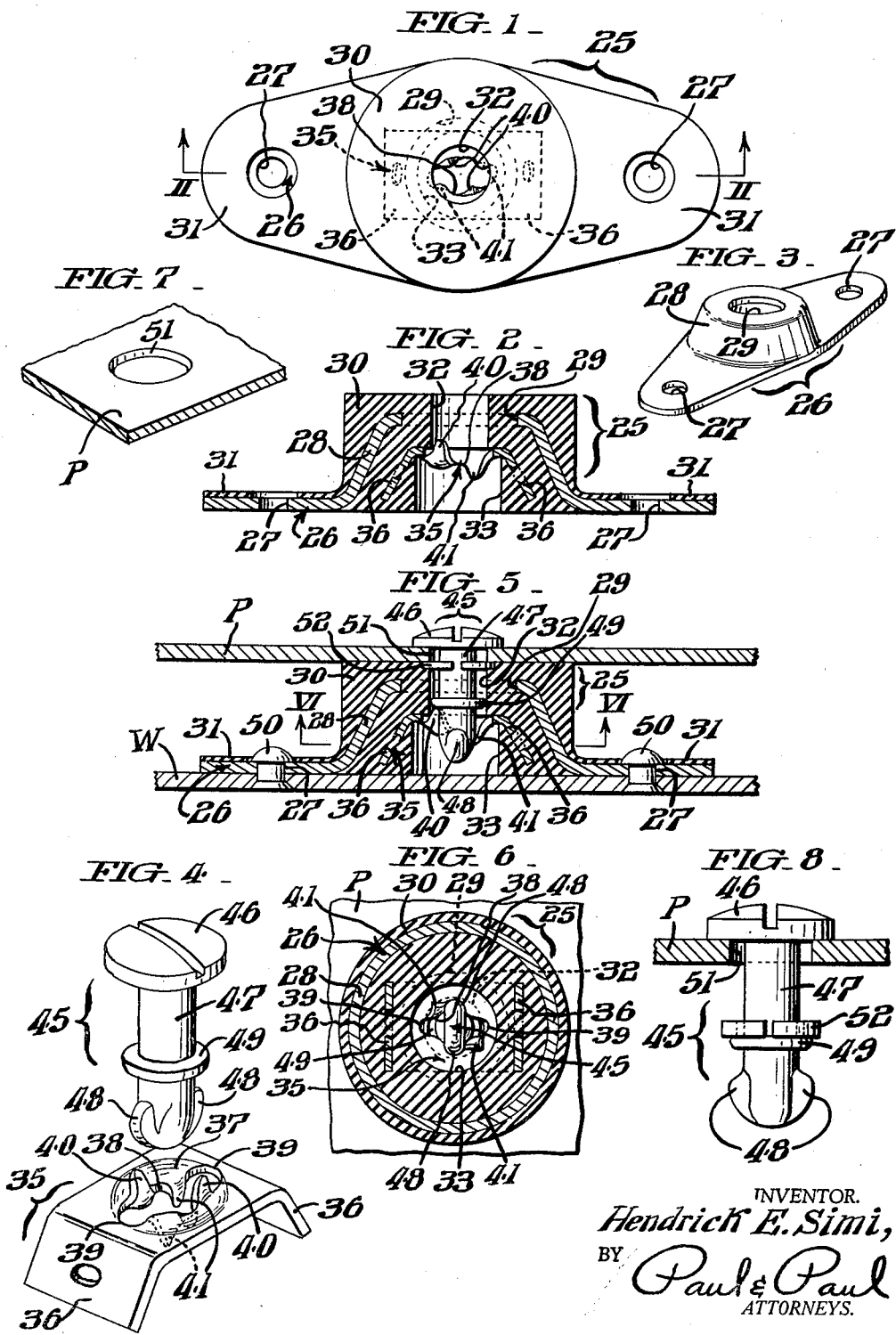

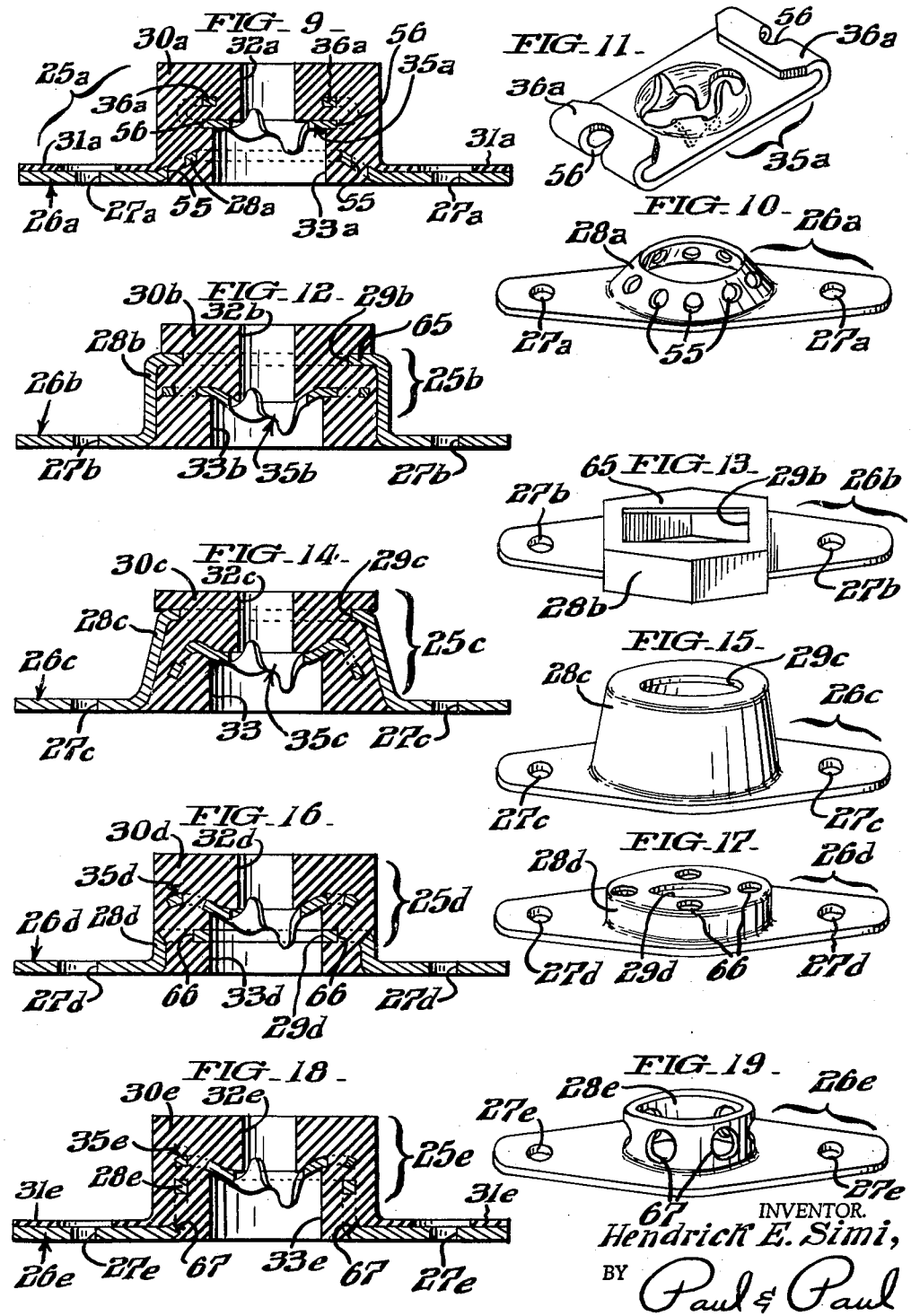

United States Patent Office 3,060,538
Patented Oct. 30, 1962

3,060,538
FASTENING DEVICE
Hendrick E. Simi, Bellevue, Wash., assignor to South Chester Corporation, Lester, Pa.
Filed Nov. 3, 1959, Ser. No. 850,617
10 Claims. (Cl. 24—221)

This invention relates to fastening devices. More specifically, it is concerned with fastening devices useful in attaching paneling to a supporting structure, for example, in attaching the inside sheathing skin or paneling of an aircraft fuselage or of a boat to the frame members whereto the outside sheathing is secured.

The chief aim of my invention is to provide a simple and inexpensive device by which sheathing or paneling can be quickly secured in place, and which will thereafter prevent transmission thereto from the supporting structure of sound vibrations as well as mechanically-produced vibrations by running motors as would be the case in boats or aircraft.

Other objects and attendant advantages will appear from the following detailed description of the attached drawings, wherein:

FIG. 1 shows in plan one of the components of a fastening device embodying my invention in one form.

FIG. 2 shows the longitudinal section of said component taken as indicated by the angled arrows II—II in FIG. 1.

FIG. 3 is a perspective view of one of the elements incorporated in the component of FIGS. 1 and 2.

FIG. 4 is a perspective view showing in juxtaposition another element incorporated in the component of FIGS. 1 and 2, and a complemental component of the device adapted to interlock with said element.

FIG. 5 is a fragmentary view in section showing a panel secured to a supporting structure by means of the fastening device.

FIG. 6 is a fragmentary view in section taken as indicated by the angled arrows VI—VI in FIG. 5.

FIG. 7 is a perspective view of a fragment of the panel with a hole provided therein for reception of the complement locking component aforesaid.

FIG. 8 is a fragmentary view in section showing the locking component of the device assembled with the panel.

FIG. 9 is a sectional view corresponding to FIG. 2 showing a modified form of one of the components of the device.

FIGS. 10 and 11 are perspective views of two of the elements of the modified component of FIG. 9.

FIG. 12 is a view likewise similar to FIG. 2 showing another modified form of one of the components of the device.

FIG. 13 is a perspective view of one of the parts of the component illustrated in FIG. 12.

FIGS. 14 and 15 are views corresponding to FIGS. 12 and 13 of an alternative embodiment.

FIGS. 16 and 17 are views likewise corresponding to FIGS. 12 and 13 and showing another alternative embodiment of the invention.

FIGS. 18 and 19 are views in turn corresponding to FIGS. 12 and 13 of another modification.

FIGS. 20, 22, 21 and 23 are views corresponding respectively to FIGS. 1, 3, 5 and 8 of still another alternative embodiment of the invention.

With more detailed reference first more particularly to FIGS. 1–8 of the drawings, the fastening device of my invention therein illustrated comprises a component 25 having an elongated base element 26 (separately shown in FIG. 3) which, in practice, is struck from suitably stiff sheet metal which is apertured at opposite ends as 27 which is provided medially with an outstanding frusto-conical boss 28 and provided with an axial opening 29 in the top thereof. From FIG. 2 it will be noted that the boss 28 of the base element 26 is bond embedded in a cylindrical block 30 of resilient material, preferably of neoprene or the like, having apertured flaps 31 overlaid upon and bonded to the flat extremities of said base element. As shown, the block 30 has an axial hollow, the upper portion 32 of which is considerably smaller in diameter than the opening 29 in the boss 28 of the base element 26, and of which the lower portion 33 is of a diameter large enough to clear lugs 48 on stud 45. Also incorporated in the component 25 is a nut element or stud receptacle 35 (separately illustrated in FIG. 4) which is struck from an oblong blank of stiff sheet metal with end portions 36 downwardly bent at an angle corresponding substantially to the slope of the frusto-conical boss 28 of the base element 26, said end portions being provided with holes for penetration by the material of the block. The mid-portion of the nut-like element 35 is spherically depressed as at 37 and provided with a round axial aperture 38 having round ended diametral slot extensions 39. Displaced upwardly and downwardly from opposite sides of the aperture 38 in the element 35 are small tongues 40 and 41, tongues 40 being diametrically opposite each other and the tongues 41 likewise, and said tongues 40 being humped at the bottom for a purpose later on explained. As shown in FIG. 2, the nut-like element 35 is incorporated in the resilient block 30 with its downwardly bent end portions 36 embedded in the material of said block, with its midportion centered in said block at the level of the shoulder juncture between the two portions 32, 33 of the axial hollow in said block.

For cooperation with the component 25, I have devised a component in the form of a draw bolt or stud 45 which is separately illustrated in FIG. 4, said bolt having a slotted head 46 and a shank 47 equal in diameter to the aperture 38 in the nut-like element 35 and being provided at its distal end with a pair of arcuate diametral wings 48 whereof the edges are rounded, said wings being so proportioned as to pass freely through upper portion 32 of the axial hollow in the boss 30 and the slotted end portions of the aperture 38 in said nut-like element. Between the head 46 and the wings 48, the bolt 45 has an integrally formed collar 49.

In the use of the device, the component 25 is secured, as shown in FIG. 5 to a wall W which, for example, may be that of the fuselage or cabin of an aircraft, by means of rivets 50. The draw bolt 45 is pre-assembled with a panel P by insertion of its shank 47 through a round hole 51 in said panel of a size to clear the collar 49 and the wings 48 of the bolt, after which a split retaining washer 52 is applied to the bolt shank as in FIG. 8. Thus by co-action of the bolt head 46 and the washer 52 with the opposite faces of the panel P the draw bolt 45 is permanently held assembled with the panel and thereby safe-guarded against loss as will be readily understood from FIG. 8. If desired, the head of the bolt 45 may be shaped otherwise than illustrated, i.e. it may be polygonal for wrench application instead of being slotted for a screwdriver, or it may be coned and the hole in the panel counter-sunk to correspond. To apply the panel P, it is brought up to the wall W and butted against the exposed face of the resilient block 30 of the component 25, the shank of the bolt 45 being incidentally inserted through the hollow of said block and its wings 48 passed through the notched aperture 38 of the nut element 35. The draw bolt 45 is thereupon rotated clockwise, the wings 48 of said bolt incidentally under-riding the cam projections 40 of the nut element, and finally snapping into notches between the projections 40 and 41 of said element and being therein held by the resiliency of material of the block, rotation of the bolt being restricted to a quadrant by encounter of its wings with the stop projections 41 as will be readily understood from FIGS. 3 and 4. The panel P is thus removably fastened to the wall with the resilient block 30 acting as a spacer and also as a buffer or damping means to prevent transmission of vibrations from the panel or sheathing to the wall and vice versa.

In the embodiment illustrated in FIGS. 9–11, the outstanding frusto-conical boss 28a of the base element 26a of the component 25a is of less depth than that of the boss of the base component of the first described embodiment, and is provided with a plurality of annularly spaced holes 55 for penetration by the resilient material of the spacer block 30a. It will further be observed that, in this modification, the opposite end portions 36a of the nut-like element 35a (see FIG. 11) instead of being angularly bent downwardly, are upwardly rounded in this instance and retroverted and, moreover, are notched at the rounded bends as at 56 for penetration by the material of the block 30a when said element is incorporated in the block as in FIG. 9.

In the modification of FIGS. 12 and 13, the boss 28b of the base element of the component 25b is polygonal, i.e. hexagonal, and provided in the top thereof with a centralized oblong opening 29b. The nut-like element 35b is here substantially identical with that of the first described embodiment but the greater portion of the block 30b is contained within the hollow of the boss 28b of the base element with a substantial portion projecting thereabove, the flange 65 about the opening 29b in the top of said boss inwardly penetrating the block as shown in FIG. 12. Due to the polygonal shape of the boss 28b of the base element 26b and the oblong opening in the top thereof, the block 30b is effectively held in and bonded to said base element. The modified construction of FIGS. 14 and 16 is similar to construction of FIGS. 12 and 13 except that, in this case, the outstanding boss 28c of the base element 26c of the component 25c is frusto-conical in configuration, and in that the nut-like element 35c is identical with the nut-like element of the first described embodiment and similarly embedded in the resilient spacer block 30c.

In the alternative embodiment of FIGS. 16 and 17, the boss 28d of the base element 26d of the component 25d is cylindrical and relatively shallow in depth, and the flange around the top opening 29d is provided with a plurality of annularly spaced holes 66. As shown in the assembly of FIG. 16, the resilient spacer block 30d is of the same diameter as the boss 28d of the base element 26d, and the material of said block extends through the holes in the flange about the opening in the top of said boss. The nut-like element 35d here is somewhat shorter in length than those of the previous embodiments and the ends thereof are substantially horizontal and embedded in the material of the block at a level considerably above the top of the boss of the base element 28d.

The modified embodiment of FIGS. 18 and 19 is generally like that of FIGS. 16 and 17 except that in this case the boss 28e of the base element 26e of the component 25e is devoid of an internal flange at the top and is provided with a plurality of annularly spaced holes 67 in the side thereof. A further departure will be noted here however, in that the diameter of the resilient spacer block 30e is considerably larger than that of the boss 28e of the base element 26e and has side flaps 31e overlying and bonded to the flat end portions of said base element. As shown in FIG. 18, the base element 28e is maintained permanently assembled with the block 30e by reason of penetration of the material of said block through the lateral holes 67 in the boss of said base element.

In the last of the alternative embodiments illustrated in FIGS. 20–23 of the drawings, the axial hollow of the resilient block 30f has end portions 32f which are equal in length and which lead to a central portion 33f of a larger diameter. In this instance, two nut-like elements 35f are embedded in the material of the block 30f respectively in the meeting shoulder planes of the end portions 32f of the hollow in said block with the central portion 33f. Here, each of the nut elements 35f is in the form of a dished disk having a plurality of holes 68 annularly arranged about its central opening, through which holes the material of the block extends as shown in FIG. 21. In this case, both the wall W and the panel P are provided with openings and with each of them is associated a draw bolt 45f, which as instanced in FIG. 23, is permanently retained by a split washer 52f. In the use of this alternative device, the component 25f is secured to the wall W and the panel P to the component 25f by means of two draw bolts 45f engaged with the corresponding nut elements 35f embedded in the resilient block 30f as shown in FIG. 21. The block 30f serves here, as in the previously described embodiments, as a vibration damping spacer between the wall W and the panel P, and also provides against conductance of static or other electricity between the wall and the panel.

While in accordance with the provisions of the statutes, I have illustrated and described the best forms of embodiment of my invention now known to me, it will be apparent to those skilled in the art that changes may be made in the forms of the apparatus described without departing from the spirit and scope of the invention as set forth in the appended claims, and that in some cases certain features of my invention may be used to advantage without a corresponding use of other features.

Having thus described my invention, I claim:

1. In a vibration-damping device for fastening a retractable member to a supporting structure, a component adapted for use with an elongated stud element rotatably engaged with said retractable member and having a pair of diametral wing projections formed at the distal end of the shank thereof, comprising a base element adapted to be secured to said supporting structure, said base element being struck from stiff sheet material and having an outstanding boss with an opening in the top thereof, a spacer block of resilient material bonded to said base element, said block having an axial hollow smaller in diameter than the opening in the top of the boss of said base element, said block being lodged at least partly within said boss and extending ontwardly therefrom with the edges around the opening in said boss embedded in the material of the block, a metallic stud receptacle wholly embedded within said block intermediate of opposite ends thereof, said stud receptacle having a round opening formed therein aligned in coaxial relation with the hollow in said block and the opening in said base element, said opening in said receptacle having a pair of lateral slot extensions formed adjacent thereto, said openings and slot extensions being adapted to receive and pass the distal end of said shank of said stud element, there being a pair of cam surfaces formed adjacent said opening in said receptacle and extending outwardly from the periphery thereof toward said supporting structure, and a pair of stop projections formed adjacent said cam surfaces, said cam surfaces being adapted to engage said wing projections of said stud element and to draw said stud element toward said supporting structure as said stud element is rotated through a partial turn and said stop projections being adapted to abut said wing projections and to position said stud element, whereby said retractable member is secured to said supporting structure by compression of the resilient material of said block between said retractable member and said stud receptacle.

2. The device defined in claim 1 wherein the said receptacle is embedded within the portion of said block within the boss of said base element at a level below the top thereof.

3. A fastening device according to claim 1, wherein said receptacle is embedded in the resilient block above and spaced from the top of the boss of said base element, and wherein a plurality of annularly spaced holes are provided around the opening in the top of the boss of the base element for penetration by the material of the resilient block.

4. In a fastening device according to claim 1, wherein the boss of said base element is provided with a plurality of annularly spaced holes in the side thereof for penetration by the material of the block.

5. In a vibration-damping device for fastening a retractable member to a supporting structure, a compressible component adapted for use with a rotatable stud having a shank extending through said retractable member, comprising a base element adapted to be secured to said supporting structure, said base element being struck from stiff sheet material and having an outstanding boss with a round opening in the top thereof, a spacer block of resilient material bonded to said base element, said block having an axial hollow smaller in diameter than the opening in the top of the boss of said base element, said block being lodged at least partly within said boss and extending outwardly therefrom with the edges around the opening in said boss embedded in the material of the block, said block being arranged to serve as a buffer between said retractable member and said supporting structure, means wholly embedded within said block intermediate the opposite ends thereof for engaging the shank of said stud, said stud engaging means being aligned in coaxial relation with said hollow in said block and arranged to draw said stud toward said supporting structure and to lock said stud in position as said stud is rotated through a partial turn, thereby securing said retractable member to said supporting structure by compression of the resilient materials in said block between said stud engaging means and said retractable member.

6. In a vibration-damping device for fastening a retractable member to a supporting structure, the combination which comprises a stud element adapted for rotatable engagement with said retractable member and having a plurality of wing projections formed at the distal end of the shank thereof, a base element adapted to be secured to said supporting structure, said base element having an outstanding boss with an opening formed in the top thereof, an axially hollow spacer block of resilient material bonded to said base element and having said boss of said base element at least partially embedded therein, said opening in said boss having a greater diameter than that of the hollow in said block and being in substantial alignment therewith, said spacer block being arranged to provide a buffer between said retractable member and said supporting structure, a metallic stud receptacle embedded within said block adjacent said boss and spaced apart from the top thereof with material of said block intervening therebetween, said stud receptacle having a rounded opening formed therein aligned in coaxial relation with the hollow in said block, said opening in said receptacle having a plurality of lateral slot extensions formed adjacent thereto, said openings and said slot extensions being adapted to receive and pass the distal end of said shank of said stud element, there being a plurality of cam surfaces adjacent said opening in said receptacle and extending outwardly from the periphery thereof toward said supporting structure, and a plurality of stop projections formed adjacent said cam surfaces, said cam surfaces being adapted to engage said wing projections of said stud element and to draw said stud element toward said supporting structure as said stud element is rotated through a partial turn and said stop projections being adapted to abut said wing projections and to position said stud element, whereby said retractable member is secured to said supporting structure by compression of the resilient material of said block between said retractable member and said stud receptacle.

7. In a vibration-damping device for fastening a retractable member to a supporting structure, the combination which comprises a stud element adapted for rotatable engagement with said retractable member and having a plurality of wing projections formed at the distal end of the shank thereof, a base element adapted to be secured to said supporting structure, said base element having an outstanding boss with an opening formed in the top thereof, an axially hollow spacer block of resilient material bonded to said base element and having said boss of said base element at least partially embedded therein, said opening in said boss having a greater diameter than that of the hollow in said block and being in substantial alignment therewith, said spacer block being arranged to provide a buffer between said retractable member and said supporting structure, a metallic stud receptacle embedded within said block interiorly of said boss with material of said block intervening therebetween, said stud receptacle having end prolongations inclined at an angle corresponding to the slope of said boss of said base element, said stud receptacle having a rounded opening formed therein aligned in coaxial relation with the hollow in said block, said opening in said receptacle having a plurality of lateral slot extensions formed adjacent thereto, said openings and said slot extensions being adapted to receive and pass the distal end of said shank of said stud element, there being a plurality of cam surfaces adjacent said opening in said receptacle and extending outwardly from the periphery thereof toward said supporting structure, and a plurality of stop projections formed adjacent said cam surfaces, said cam surfaces being adapted to engage said wing projections of said stud element and to draw said stud element toward said supporting structure as said stud element is rotated through a partial turn and said stop projections being adapted to abut said wing projections and to position said stud element, whereby said retractable member is secured to said supporting structure by compression of the resilient material of said block between said retractable member and said stud receptacle.

8. A vibration-damping fastening device according to claim 7, wherein a plurality of annularly spaced holes in the side of the frusto-conical boss of the base element are penetrated by the material of the block.

9. In a vibration-damping device for fastening a retractable member to a supporting structure, the combination which comprises a stud element adapted for rotatable engagement with said retractable member and having a plurality of wing projections formed at the distal end of the shank thereof, a base element adapted to be secured to said supporting structure, said base element having an outstanding boss with an opening formed in the top thereof, an axially hollow spacer block of resilient material bonded to said base element and having said boss of said base element at least partially embedded therein, said opening in said boss having a greater diameter than that of the hollow in said block and being in substantial alignment therewith, said spacer block being arranged to provide a buffer between said retractable member and said supporting structure, a metallic stud receptacle embedded within said block interiorly of said boss with material of said block intervening therebetween, said stud receptacle having end prolongations formed with rounded retroversions which are notched for penetration by the material of said block, said stud receptacle having a rounded opening formed therein aligned in coaxial relation with the hollow in said block, said opening in said receptacle having a plurality of lateral slot extensions formed adjacent thereto, said openings and said slot extensions being adapted to receive and pass the distal end of said shank of said stud element, there being a plurality of cam surfaces adjacent said opening in said receptacle and extending outwardly from the periphery thereof toward said supporting structure, and a plurality of stop projections formed adjacent said cam surfaces, said cam surfaces being adapted to engage said wing projections of said stud element and to draw said stud element toward said supporting structure as said stud element is rotated through a partial turn and said stop projections being adapted to abut said wing projections and to position said stud element, whereby said retractable member is secured to said supporting structure by compression of the resilient material of said block between said retractable member and said stud receptacle.

10. A fastening device according to claim 9, wherein the side of the frusto-conical boss of the base element is provided with a plurality of annularly spaced holes for penetration of the material of the block; and wherein the end prolongations of said receptacle have rounded retroversions which are notched for penetration by the material of said block.

References Cited in the file of this patent

UNITED STATES PATENTS

| | | |
|---|---|---|
| 1,951,013 | Flintermann | Mar. 13, 1934 |
| 1,957,694 | Chamberlain et al. | May 8, 1934 |
| 2,115,713 | Haire | May 3, 1938 |
| 2,132,840 | Workman et al. | Oct. 11, 1938 |
| 2,334,680 | Murphy | Nov. 16, 1943 |
| 2,356,162 | Johnson et al. | Aug. 22, 1944 |
| 2,370,799 | Kelley | Mar. 6, 1945 |
| 2,455,891 | Flanagan | Dec. 7, 1948 |
| 2,767,528 | Tocci-Guilbert | Oct. 23, 1956 |

FOREIGN PATENTS

| | | |
|---|---|---|
| 887,567 | France | Aug. 16, 1943 |
| 1,091,673 | France | Nov. 3, 1954 |
| 456,004 | Great Britain | Nov. 2, 1936 |
| 89,570 | Norway | July 15, 1957 |